United States Patent
Umemoto et al.

(10) Patent No.: US 6,742,921 B2
(45) Date of Patent: Jun. 1, 2004

(54) LIGHT PIPE, PLATE LIGHT SOURCE UNIT AND REFLECTION TYPE LIQUID-CRYSTAL DISPLAY DEVICE

(75) Inventors: Seiji Umemoto, Osaka (JP); Toshihiko Ariyoshi, Osaka (JP); Takao Suzuki, Osaka (JP); Shuuji Yano, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/888,530

(22) Filed: Jun. 26, 2001

(65) Prior Publication Data

US 2002/0015314 A1 Feb. 7, 2002

(30) Foreign Application Priority Data

Jun. 26, 2000 (JP) ........................................ 2000-190512
Aug. 29, 2000 (JP) ........................................ 2000-258354

(51) Int. Cl.⁷ .......................... G02F 1/1335; F21V 13/14
(52) U.S. Cl. ............................ 362/561; 362/19; 362/31; 362/330; 362/339; 349/63; 349/65
(58) Field of Search ............................ 349/61–65, 67; 362/19, 31, 330, 339, 558, 561

(56) References Cited

U.S. PATENT DOCUMENTS

| | | | | |
|---|---|---|---|---|
| 5,046,826 A | * | 9/1991 | Iwamoto et al. | 349/65 |
| 5,341,231 A | * | 8/1994 | Yamamoto et al. | 349/63 |
| 5,461,547 A | * | 10/1995 | Ciupke et al. | 362/31 |
| 5,467,208 A | * | 11/1995 | Kokawa et al. | 349/67 |
| 5,550,676 A | * | 8/1996 | Ohe et al. | 362/31 |
| 5,587,816 A | * | 12/1996 | Gunjima et al. | 349/62 |
| 6,108,059 A | * | 8/2000 | Yang | 349/65 |
| 6,266,108 B1 | * | 7/2001 | Bao et al. | 349/63 |
| 6,340,999 B1 | * | 1/2002 | Masuda et al. | 349/63 |

* cited by examiner

Primary Examiner—Alan Cariaso
(74) Attorney, Agent, or Firm—Sughrue Mion, PLLC

(57) ABSTRACT

A light pipe includes a plate-like member having light output means formed in its upper surface so that light incident on an incidence side surface of the plate-like member is exited from the lower surface of the plate-like member through the light output means, an adhesive layer having a refractive index lower than that of the plate-like member, and (i) an anti-reflection layer made of a circularly polarizer and bonded to a lower surface of the plate-like member through the adhesive layer or (ii) a light-diffusing layer having a surface of fine prismatic structures and bonded to a lower surface of the plate-like member through the adhesive layer. A plane light source unit includes at least one light source disposed on one side surface of the light pipe. A reflection type liquid-crystal display device includes the plane light source unit and a liquid-crystal cell including a reflection layer disposed on the light output side of the plane light source unit.

20 Claims, 6 Drawing Sheets

LIGHT PIPE, PLATE LIGHT SOURCE UNIT AND REFLECTION TYPE LIQUID-CRYSTAL DISPLAY DEVICE

BACKGROUND OF THE INVENTION

1. Field of the Invention

The present invention relates to a light pipe excellent in light-utilizing efficiency to make it possible to form a reflection type liquid-crystal display device bright and easy to view, and a plane light source unit using the light pipe.

The present application is based on Japanese Patent Applications No. 2000-190512 and 2000-258354, which are incorporated herein by reference.

2. Description of the Related Art

There is known a reflection type liquid-crystal display device using a front-lighting system in which a plane light source unit including a side-lighting type light pipe making viewing in a dark place, or the like, possible is disposed on the visual side and in which an anti-reflection layer including a circularly polarizer is added to a lower surface of the light pipe (Unexamined Japanese Patent Publication No. Hei. 12-111900). When a display screen is viewed through the plane light source unit disposed on the visual side, light reflected by a liquid-crystal cell, or the like, under the light pipe overlaps a display image to thereby cause white paling or lowering of contrast, resulting in deterioration of visibility both in an operating mode and in an external light mode. Therefore, the anti-reflection layer is provided for preventing the reflected light from being generated. In the background-art reflection type liquid-crystal display device, however, lowering of luminance caused by addition of the anti-reflection layer is conspicuous in an operating mode. Moreover, luminance decreases largely as the position goes farther from the light source. There is a problem that variation in brightness and darkness is large.

Further, there is also known a reflection type liquid-crystal display device using a front-lighting system in which a plane light source unit constituted by a side-lighting type light pipe to make viewing in a dark place, or the like, possible is disposed on the visual side and in which a light-diffusing layer having a surface of fine prismatic structures is added to a lower surface of the light pipe through an adhesive layer (Unexamined Japanese Patent Publication No. Hei. 11-281980). Output light (display light) interferes with light reflected by the lower surface of the light pipe and by the liquid-crystal cell, so that moire (stripe-like brightness and darkness) occurs. The light-diffusing layer is provided for the purposes of: preventing the moire by scatter reflection, scattering at the time of transmission; preventing external incident light from being reflected by the lower surface of the light pipe and from forming an image of the external incident light. The moire reduces visibility greatly because a stripe pattern of brightness and darkness moves in a viewing position to form a glare visual sense. In the background-art reflection type liquid-crystal display device, however, contrariwise to the aforementioned advantage given by the addition of the light-diffusing layer, luminance in an operating mode decreases greatly as the position goes farther from a light source. Hence, there is also a problem that the display device has the disadvantage that variation in brightness and darkness becomes large.

SUMMARY OF THE INVENTION

An object of the present invention is to develop a light pipe and a plane light source unit in which an anti-reflection layer is added to thereby suppress lowering of luminance and variation in luminance in an operating mode while white paling, lowering of contrast, or the like, deteriorating visibility because of overlapping of light reflected by the lower surface side of the light pipe with a display image is prevented both in an operating mode and in an external light mode to thereby make it possible to form a reflection type liquid-crystal display device which uses a front-lighting system and which is excellent in visibility such as contrast, brightness, etc.

An object of the present invention is to develop a light pipe and a plane light source unit in which a light-diffusing layer is added to thereby suppress variation in luminance in an operating mode while preventing an image of external incident light from being formed and preventing moire from occurring to thereby make it possible to form a reflection type liquid-crystal display device which uses a front-lighting system and which is bright and excellent in display quality.

From a first aspect, the present invention provides a reflection type liquid-crystal display device comprising a light pipe including a plate-like member having light output means formed in its upper surface so that light incident on an incidence side surface of the plate-like member is exited from the lower surface of the plate-like member through the light output means, an adhesive layer having a refractive index lower than that of the plate-like member, and an anti-reflection layer made of a circularly polarizer and bonded to a lower surface of the plate-like member through the adhesive layer; a plane light source unit including at least one light source disposed on one side surface of the light pipe; and a liquid-crystal cell including a reflection layer disposed on the light output side of the plane light source unit.

According to the above invention, the anti-reflection layer including a circularly polarizer and provided on the lower surface of the plate-like member suppresses light reflected by the lower surface of the light pipe and leaking from the upper surface of the plate-like member without entering the liquid-crystal cell or the like. Hence, the leaking light to be a cause of generation of white paling or lowering of contrast because of overlapping of the leaking light with the display image from the liquid-crystal cell in viewing from the upper surface is little so that good visibility can be achieved both in an operating mode and in an external light mode. Incidentally, the reflectance by the lower surface of the light pipe is estimated as a value of from about 3 to about 5% in light output from the light pipe or in external incident light. In this case, the reflected light has strong influence on white paling or contrast of the display image if the reflected light is not suppressed by the anti-reflection layer.

On the other hand, the anti-reflection layer is bonded through an adhesive layer having a refractive index lower than that of the plate-like member. Hence, lowering of luminance or variation in luminance in an operating mode can be reduced greatly. This is based on the investigation on the problem in the background-art method. That is, it was conceived in the background art that suppression of reflection in the interface between the plate-like member and the anti-reflection layer was favorable for improvement of luminance and that bonding the plate-like member to the anti-reflection layer through an adhesive layer having a refractive index as near as possible to reduce the difference between refractive indices in respective interfaces as greatly as possible was favorable for improvement of luminance. In this case, however, light β0 incident on the side surface of the plate-like member or transmitted light thereof is apt to be transmitted through the adhesive layer 14 because of the lowering of the interfacial refractive index difference and enter a linearly polarizer 12b constituting the anti-reflection layer 12 as represented by the bent arrows β0, β1 and α0" in FIG. 8. Generally, about a half of the light β1 entering the linearly polarizer is absorbed. Hence, the light α0" transmitted backward is reduced greatly because of the absorption loss of the light β1.

On the other hand, in accordance with the present invention, the incident light β0 is apt to be totally reflected because of the refractive index difference between the plate-like member and the adhesive layer 13 as represented by the bent arrows β0 and α0' in FIG. 7. Moreover, light which is large in incident angle on the adhesive layer to be apt to be transmitted backward is influenced easily by the total reflection. Hence, the light hardly enters the linearly polarizer and the efficiency of backward transmission of light is improved. As a result, luminance is improved and variation in luminance is reduced, so that uniformity of luminance in the light exit surface of the light pipe is improved. Hence, a plane light source unit for a front-lighting system can be obtained as a unit excellent in light-utilizing efficiency and excellent in brightness and its uniformity. Hence, a reflection type liquid-crystal display device using a front-lighting system can be obtained as a device excellent in contrast and brightness both in an operating mode and in an external light mode and excellent in display quality.

From a second aspect, the present invention provides a reflection type liquid-crystal display device comprising a light pipe including a plate-like member having light output means formed in its upper surface so that light incident on an incidence side surface of the plate-like member is exited from the lower surface of the plate-like member through the light output means, an adhesive layer having a refractive index lower than that of the plate-like member, and a light-diffusing layer having a surface of fine prismatic structures and bonded to the lower surface of the plate-like member through the adhesive layer; a plane light source unit including at least one light source disposed on one side surface of the light pipe; and a liquid-crystal cell including a reflection layer disposed on the light output side of the plane light source unit.

According to the above invention, the light-diffusing layer is bonded through an adhesive layer having a refractive index lower than that of the plate-like member. Hence, variation in luminance in an operating mode can be suppressed greatly. This is based on the investigation on the problem in the background-art method. That is, it was conceived in the background art that suppression of reflection in the interface between the plate-like member and the light-diffusing layer was favorable for improvement of luminance in terms of prevention of reflection loss, and that bonding the plate-like member to the light-diffusing layer through an adhesive layer having a refractive index as near as possible to reduce the difference between refractive indices in respective interfaces as greatly as possible was favorable for improvement of luminance in terms of suppression of reflection loss.

In this case, however, light β0 incident on the side surface of the plate-like member 101 or transmitted light thereof is apt to be transmitted through the adhesive layer 115 because of the lowering of the interfacial refractive index difference and enter the light-diffusing layer 112 as represented by the bent arrows β0, β0', β1' and β1" in FIG. 15. The incident light is scattered β1' in the interface between the fine structure surface and air, so that there is generated a great amount of light β0', β1" leaking from the upper and lower surfaces of the light pipe. In addition to this, the light β0' leaking from the lower surface is made incident on the liquid-crystal cell 120 at a large incident angle. Hence, the light leaking from the upper and lower surfaces does not contribute to illumination of the liquid-crystal cell and reduces the light to be transmitted to the back of the plate-like member. Moreover, the light β1" leaking from the upper surface is apt to cause lowering of contrast of display light. In addition, scattering owing to the light-diffusing layer brings variation also in the directions of the output light β1, β2, β3 and β4 serving as illumination light or display light through the light output means, or the like, to thereby deteriorate light-condensing characteristic to thereby darken display in the viewing direction because of the enlargement of the light distribution.

On the other hand, in accordance with the present invention, the incident light α0 is apt to be totally reflected because of the refractive index difference between the plate-like member and the adhesive layer 113 as represented by the bent arrows α0 and α1 in FIG. 14. Moreover, light which is large in incident angle on the adhesive layer to be transmitted backward is influenced easily by the total reflection. Hence, the light hardly enters the light-diffusing layer 112 and the efficiency of backward transmission of light is improved. Moreover, the directions of the output light α1, α2, α3 and α4 through the light output means, or the like, hardly vary. Hence, light-condensing characteristic is improved to thereby improve luminance in a narrow light distribution to there by make display bright in the viewing direction. As a result, a plane light source unit for a front-lighting system can be obtained as a unit excellent in light-utilizing efficiency and excellent in brightness and its uniformity. Hence, a reflection type liquid-crystal display device using a front-lighting system can be obtained as a device excellent in brightness and display quality both in an operating mode and in an external light mode because moire or an image of reflected light of external light is hardly generated.

Features and advantages of the invention will be evident from the following detailed description of the preferred embodiments described in conjunction with the attached drawings.

DETAILED DESCRIPTION OF THE PREFERRED EMBODIMENTS

Figure 1:
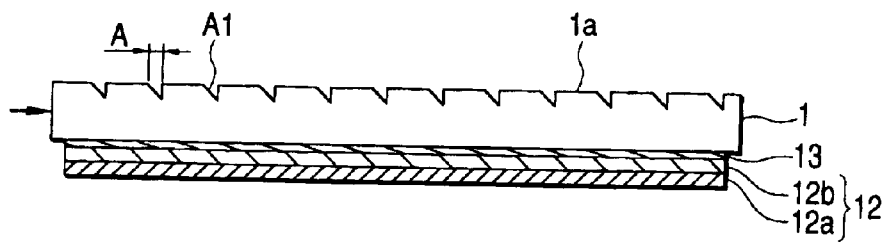
FIG. 1 shows a sectional view of a light pipe.
Figure 2:
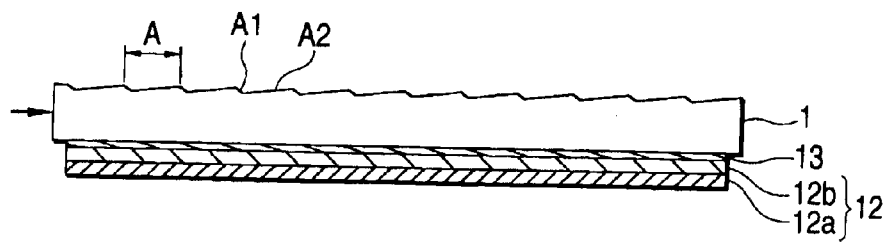
FIG. 2 shows a sectional view of another light pipe.

The light pipe according to the first aspect of the present invention comprises: a plate-like member including light output means formed in its upper surface so that light incident on an incidence side surface of the plate-like member is exited from a lower surface of the plate-like member through the light output means; an adhesive layer having a refractive index lower than that of the plate-like member; and an anti-reflection layer made of a circularly polarizer and bonded to the lower surface of the plate-like member through the adhesive layer. FIGS. 1 and 2 show examples of the light pipe. The reference numeral 1 designates a plate-like member having light output means A formed in its upper surface; 12, an anti-reflection layer; and 13, an adhesive layer.

Figure 10:
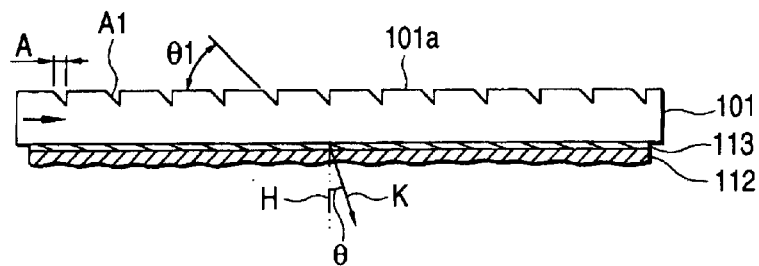
FIG. 10 shows a sectional view of a light pipe.
Figure 11:
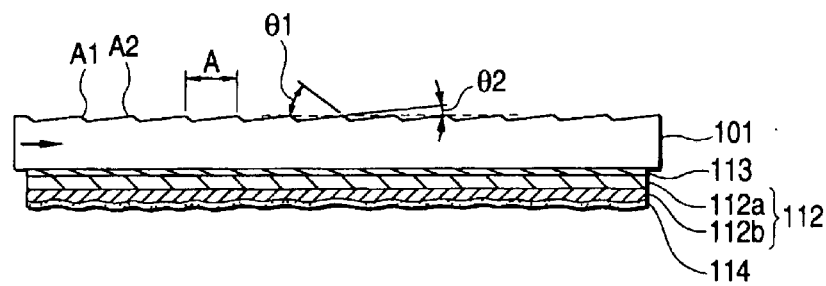
FIG. 11 shows a sectional view of another light pipe.

The light pipe according to the second aspect of the present invention comprises: a plate-like member including light output means formed in its upper surface so that light incident on an incidence side surface of the plate-like member is exited from a lower surface of the plate-like member through the light output means; an adhesive layer having a refractive index lower than that of the plate-like member; and a light-diffusing layer including a fine prismatic-structure layer formed in its surface and bonded to the lower surface of the plate-like member through the adhesive layer. FIGS. 10 and 11 show examples of the light pipe. The reference numeral 101 designates a plate-like member including light output means A formed in its upper surface; 112, a light-diffusing layer; and 113, an adhesive layer. Incidentally, the reference numeral 112a a designates a transparent film; 112b, a fine prismatic-structure layer; and 114, an anti-reflection layer. In addition, the arrow shows the direction (backward) of transmission of light incident on the incidence side surface.

Used as the plate-like member is a suitable member including light output means formed in its upper surface so that light incident on an incidence side surface is made exit from a lower surface through the light output means. Generally used is a plate-like member which has an upper surface, a lower surface opposite to the upper surface, and an incidence side surface which is one of side surfaces between the upper and lower surfaces, as shown in FIGS. 1, 2, 10 and 11. The plate-like member may be of an uniform thickness type as shown in FIGS. 1 and 2 or may be of a wedge-like type in which the thickness of a counter end opposite to the incidence side surface is set to be smaller than that of the incidence side surface. Reduction of the thickness of the counter end is advantageous in terms of reduction of weight, efficiency of incidence of light incident on the incidence side surface and transmitted light thereof toward the light output means formed in the upper surface, and so on.

The light output means formed in the upper surface of the plate-like member can be constituted by an appropriate material exhibiting the aforementioned output characteristic. The preferred is light output means by which light incident on the incidence side surface is made exit from the lower surface efficiently with good directivity and through which light incident on the lower surface is transmitted to be exited from the upper surface efficiently without scattering. Especially, the preferred in terms of good visibility in a frontal direction or its near directions, etc. is light output means in which the direction θ of the maximum intensity K of output light is within 30 degrees with respect to a normal H to a reference plane of the lower surface when light incident on the incidence side surface or transmitted light (represented by the solid arrow) thereof is exited from the lower surface as shown in FIGS. 3 and 10.

From the point of view of preventing lowering of contrast caused by overlapping of light leaking from the upper surface with a display image constituted by light exited from the lower surface in the above description, it is preferable that the maximum intensity of light leaking from the upper surface at an angle within 30 degrees with respect to the normal H is not larger than one fifth as large as the maximum intensity K in the lower surface. The light leaking at the aforementioned angle from the upper surface is apt to overlap light exited from the lower surface, reflected by the reflection layer and exhibiting the maximum intensity K. If the ratio of the maximum intensity of the light leaking from the upper surface to the maximum intensity of the light exited from the lower surface is large, the intensity of the display image is apt to be relatively reduced and the contrast is therefore apt to be reduced.

Figure 3:
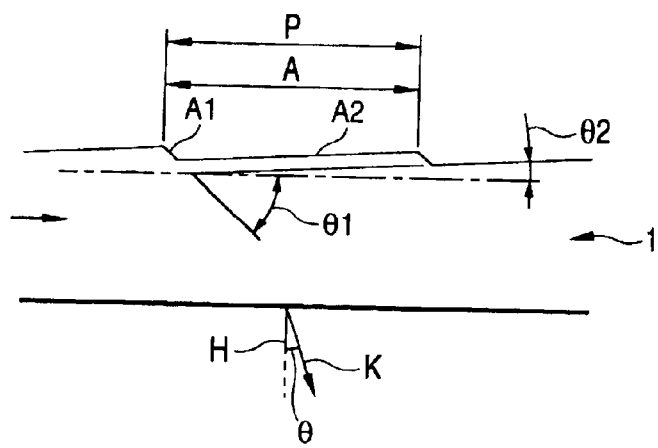
FIG. 3 shows an explanatory view of prismatic structures.

The more especially preferred from the point of view of improvement in display quality such as brightness, contrast, etc. in the case of application to a reflection type liquid-crystal display device is a plate-like member in which the aforementioned angle θ is within 28 degrees, especially within 25 degrees, more especially within 20 degrees in a plane (section in FIGS. 3 and 10) perpendicular to reference planes of both incidence side surface and lower surface as shown in FIGS. 3 and 10. Assuming that the incidence side surface is regarded as a negative direction with reference to the normal H, then the intensity L of light leaking from the upper surface at the same angle θ as that of the maximum intensity K is not larger than $\frac{1}{10}$, especially not larger than $\frac{1}{15}$, more especially not larger than $\frac{1}{20}$ as large as the maximum intensity K. Because the leaking light overlaps the direction of regular reflection of light exhibiting the maximum intensity K, the leaking light reduces the intensity of the display image to thereby reduce contrast if the ratio L/K is high.

The preferred from the point of view of achieving the aforementioned characteristic such as the direction of maximum intensity K, the ratio of the maximum intensity K to the intensity L of leaking light, etc. is light output means A having optical path changing faces A1 facing the incidence side surface (represented by the arrow source) as shown in FIGS. 1, 2, 10 and 11, especially, light output means A constituted by a plurality of prismatic structures having optical path changing faces A1 each inclined at an inclination angle in a range of from 35 to 48 degrees with respect to the reference plane of the lower surface, more especially, light output means A constituted by a repetitive structure of the aforementioned prismatic structures. The scatter type light output means such as dots, or the like, used in the back-lighting system is unsuitable for the front-lighting system because the output light lacks directivity and because light is scattered to thereby destroy the form of a display image when the display image is viewed through the light output means.

The aforementioned repetitive structure of prismatic structures can be constituted by convex or concave portions each having equilateral faces. The prismatic structure preferred from the point of view of improving light-utilizing efficiency, outputting light exited from the lower surface with good frontal (perpendicular) directivity by inverting the light through the reflection layer, or the like, is constituted by a structure of repeated arrangement in which sectionally triangular prismatic structures having optical path changing faces A1 each inclined from the incidence side surface (represented by the arrow source) side downward to the counter end side at an inclination angle ($\theta$1) in a range of from 35 to 48 degrees with respect to the reference plane of the lower surface are formed at intervals of a predetermined pitch and in which flat faces 1a each inclined at an inclination angle in a range of from 0 to 10 degrees with respect to the upper surface of the plate-like member 1 are arranged between the pitches as shown in FIGS. 1 and 10, or a structure of repeated arrangement of prism-like structure each of which has the aforementioned optical path changing face A1, and a long side face A2 ($\theta$2) inclined at an inclination angle of from 0 to 10 degrees as shown in FIGS. 2 and 11.

Incidentally, the aforementioned prismatic structures can be constituted by protrusions (convex portions) or grooves (concave portions). The light output means constituted by a structure of grooves is preferred from the point of view of attaining improvement of durability because the optical path changing faces A1 in the grooves are prevented from being injured. In the prismatic structures, each of the optical path changing faces A1 plays a role of reflecting light incident on the face A1 among incident light given from the incidence side surface to thereby supply the reflected light to the lower surface. In this case, setting the inclination angle $\theta$1 of each of the optical path changing faces to be in a range of from 35 to 48 degrees permits transmitted light $\alpha$0 ($\alpha$1 in FIG. 14) to be reflected well perpendicularly to the lower surface as shown by the bent-line arrows $\alpha$0 to ($\alpha$3 in FIG. 7 ($\alpha$0 to $\alpha$4 in FIG. 14). As a result, there can be obtained light $\alpha$1 ($\alpha$2 in FIG. 14) exited from the lower surface and exhibiting the maximum intensity K within 30 degrees with respect to the normal H. Hence, output light $\alpha$2, $\alpha$3 ($\alpha$3, $\alpha$4 in FIG. 14) (illumination light) excellent in frontal directivity can be efficiently obtained through the reflection layer 21 (121 in FIG. 14), so that bright display can be achieved.

The preferred inclination angle $\theta$1 of the optical path changing faces from the point of view of the frontal directivity, or the like, is in a range of from 38 to 45 degrees, especially in a range of from 40 to 44 degrees, in consideration of the fact that the condition for total reflection of light transmitted in the inside of the plate-like member on the basis of Snell's law of refraction is generally ±41.8 degrees, for example, when the refractive index is 1.5. Incidentally, a part of light transmitted, as leaking light, through the optical path changing faces without satisfaction of the total reflection condition has little influence on visibility in the frontal direction and its near directions because the part of light is exited at an angle of not smaller than 60 degrees with respect to the frontal direction. The part of light is, however, unfavorable for light-utilizing efficiency because light leaking from the upper surface increases easily if the inclination angle $\theta$1 is larger than 48 degrees.

Figure 7:
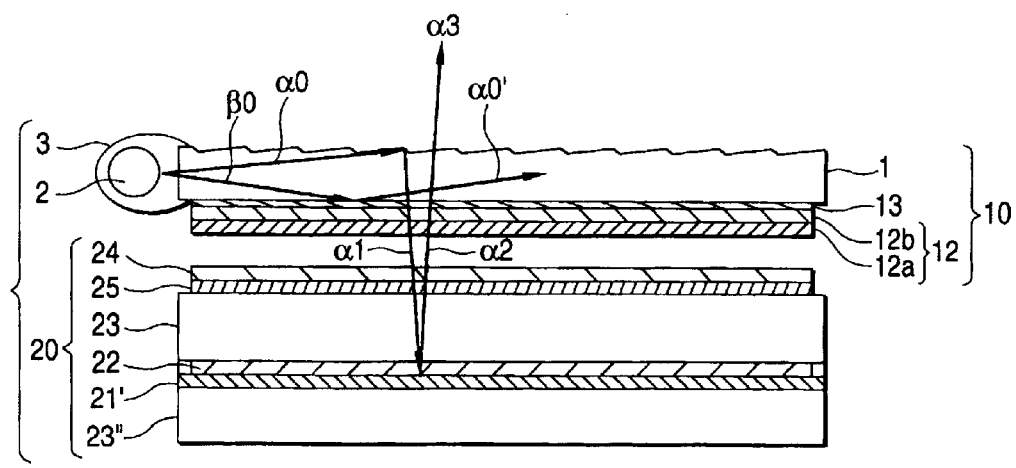
FIG. 7 shows an explanatory view of a light transmission state according to Example.
Figure 8:
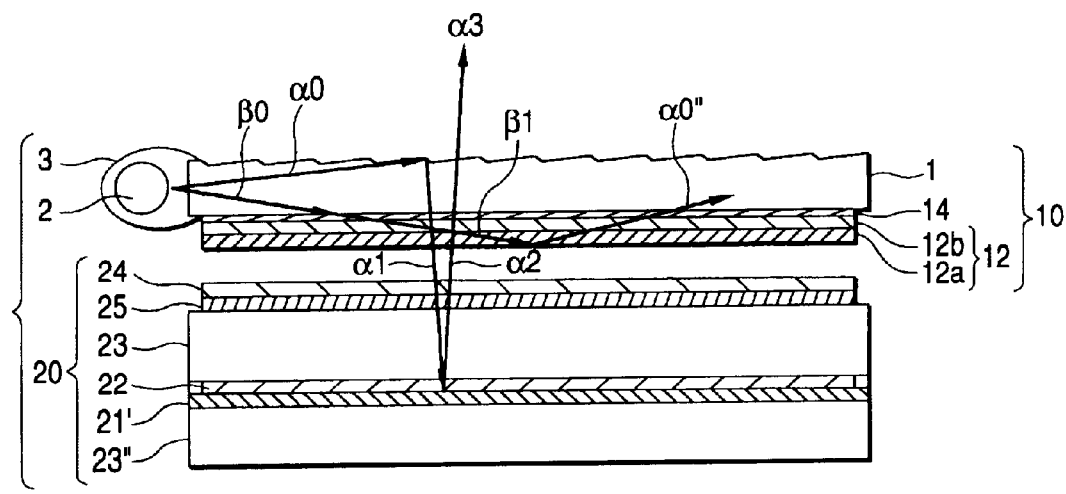
FIG. 8 shows an explanatory view of a light transmission state according to Comparative Example.
Figure 14:
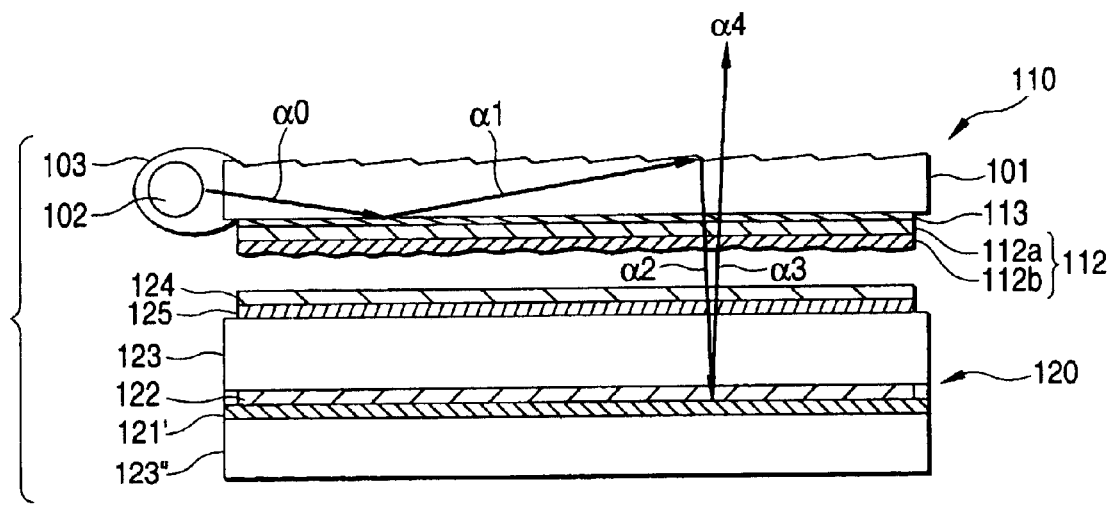
FIG. 14 shows a sectional view of another reflection type liquid-crystal display device with an explanatory view of a light transmission state.
Figure 15:
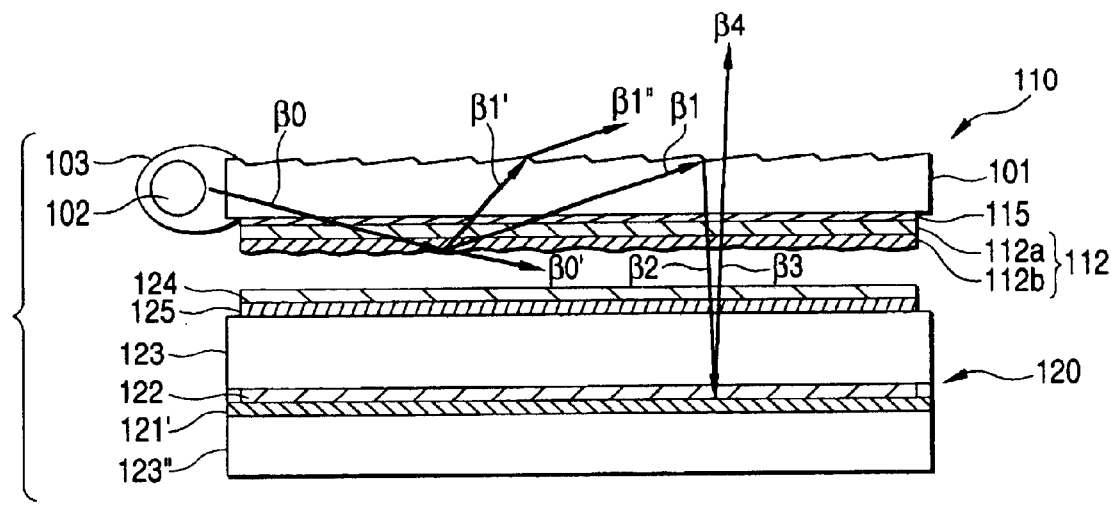
FIG. 15 shows an explanatory view of a light transmission state according to Comparative Example.

On the other hand, the flat faces 1a or long side faces A2 between the optical path changing faces A1 aim at reflecting the transmitted light incident on the flat or long side faces to supply the reflected light to the optical path changing faces, aim at transmitting ($\alpha$3 in FIG. 7 and $\alpha$4 in FIG. 14) the light $\alpha$1 ($\alpha$2 in FIG. 14) reflected by the optical path changing faces and inverted ($\alpha$2 in FIG. 7 and $\alpha$3 in FIG. 14) by the reflection layer 21' (121' in FIG. 14) to exit the light from the upper surface as shown in FIG. 7 or FIG. 14, and aim at inputting external light in a reflection mode and transmitting the light reflected by the reflection layer 21' (121' in FIG. 14) to thereby exit the light from the upper surface. From this point of view, the angle of the flat faces 1a or 101a a or the inclination angle $\alpha$2 of long side faces A2 with respect to the reference plane of the lower surface is preferably set to be in a range of from 0 to 10 degrees.

The inclination angle $\theta$2 of the long side faces, or the like, may be 0 degree (horizontal). Setting the inclination angle $\theta$2 to be larger than 0 degree permits transmitted light to be collimated when the transmitted light incident on the long side faces, or the like, is reflected so as to be supplied to the optical path changing faces. As a result, the directivity of light reflected by the optical path changing faces can be improved favorably for display. On the other hand, if the inclination angle $\theta$2 is larger than 10 degrees, the incidence factor of the light on the long side faces is reduced, and the light supplied to the counter end side is not sufficient, resulting in uneven light emission, and at the same time, the change of the light path due to refraction becomes large, resulting in reduction of light quantity in the frontal direction unfavorably for display. As for the sectional shape of the plate-like member, it becomes difficult to reduce the thickness of the counter end side and the quantity of light incident on the light output means is reduced so that light-emitting efficiency is apt to be lowered.

From the point of view of the aforementioned performance such as condensation of output light and increase of frontal light quantity owing to collimation of transmitted light, suppression of leaking light, and so on, the preferred inclination angle of the long side faces, or the like, is not larger than 8 degrees, especially not larger than 5 degrees. Adjusting the inclination angle of the optical changing faces and the inclination angle of the flat or long side faces as described above permits directivity to be given to the output light, by which light can be output in a direction perpendicular to the lower surface or at an angle near the perpendicular direction.

The preferred long side faces of the plate-like member in terms of visibility of the display image through the long side faces, or the like, are provided so that the difference between inclination angles $\theta$2 thereof is set to be within 5 degrees, especially within 4 degrees, more especially within 3 degrees all over the plate-like member and so that the difference between inclination angles $\theta$2 of adjacent long side faces is set to be within 1 degree, especially within 0.3 degree, more especially within 0.1 degree. This can suppress influence of variation, or the like, in the inclination angles $\theta$2 of the long side faces, through which light is transmitted, on the display image. If deflection of the angle of the long side faces, through which light is transmitted, varies largely according to the location, the display image becomes unnatural. Particularly if the difference in deflection between transmitted-light images in the vicinity of adjacent pixels is large, the display image is apt to become very unnatural.

The aforementioned difference between inclination angles $\theta$2 is set on the premise that the inclination angle of each long side face is not larger than 10 degrees as described above. That is, the premise is that such a small inclination angle $\theta$2 is set to be in the allowed range to suppress deflection of the display image caused by refraction at the time of transmission of light through the long side face. This aims at setting an observation point in a direction near the perpendicular direction so that the optimum viewing direction of the liquid-crystal display device thus optimized is not changed. If the display image is deflected, the optimum viewing direction shifts from the neighbor of the perpendicular direction. If the deflection of the display image is large, the optimum viewing direction may approach the direction of light leaking from the upper surface of the liquid guide plate to be apt to give bad influence on contrast, etc. Incidentally, the condition for setting the inclination angle θ2 of the long side faces, or the like, to be not larger than 10 degrees includes the condition that influence of dispersion of transmitted light, or the like, is reduced to a negligible level.

A material excellent in efficiency of incidence of external light and excellent in efficiency of transmission or output of light of a display image through or from a liquid-crystal cell is preferred from the point of obtaining a bright display image. In this respect, sectionally triangular or prism-like structures are preferably provided so that the projected area of flat or long side faces on the reference plane of the lower surface is not smaller than 5 times, especially 10 times, more especially 15 times as large as the projected area of optical path changing faces on the reference plane. By this measure, a large part of the display image based on the liquid-crystal cell can be transmitted through the flat or long side faces.

Incidentally, when the display image based on the liquid-crystal cell is transmitted, the display image incident on the optical path changing faces is reflected by the incidence side surface side so as not to be output from the upper surface or is deflected in a largely different direction opposite to the display image transmitted through the long side faces, or the like, with reference to the normal to the lower surface so as to be output with little influence on the display image transmitted through the long side faces, or the like. Accordingly, from the point of view of preventing unnatural display caused by shortage of transmission of the display light, it is preferable that the area of overlapping the optical path changing faces with pixels is reduced to secure sufficient light transmittance through the long side faces, or the like.

The pixel pitch in the liquid-crystal cell is generally in a range of from 100 to 300 $\mu$m. In consideration of this respect, the optical path changing faces are preferably formed so that the projected width of each optical path changing face on the reference plane of the lower surface is not larger than 40 $\mu$m. Incidentally, a higher-grade technique is required for forming the optical path changing faces as the projected width of each optical path changing side face decreases. As a result, a scattering effect may appear as a cause of disorder of the display image when the vertex of each of the prismatic structures is rounded with a curvature radius of not smaller than a predetermined value. Further, also from the point of view of the coherence length of a fluorescent tube generally set to be about 20 $\mu$m or the like, there is a tendency that diffraction, or the like, occurs easily as a cause of lowering of display quality when the projected width of each optical path changing face decreases. Accordingly, the projected width of each optical path changing face is especially preferably in a range of from 1 to 20 $\mu$m, more especially in a range of from 5 to 15 $\mu$m.

It is preferable from the aforementioned point of view that the interval between the optical path changing faces is large. However, because the optical path changing faces substantially serve as a portion having a function for substantially outputting light incident on the side surface, illumination at the time of operation may become more sparse to still bring about an unnatural display when the interval is too large. In consideration of these points of view, the repetition pitch P of the sectionally triangular or prism-like structures as shown in FIG. 3 is preferably set to be in a range of from 50 $\mu$m to 1.5 mm. Incidentally, the pitch may be constant or may be irregular so as to be provided as a random pitch, a random or regular combination of a predetermined number of pitch units, or the like.

When the light output means is constituted by prismatic structures, moire may occur because of interference between the light output means and the pixels of the liquid-crystal cell. Although moire can be prevented by adjustment of the pitch of the irregularities, there is a preferable range in the pitch of the prismatic structures as mentioned above. Hence, countermeasures against the case where moire still occurs even if the pitch is in the aforementioned preferable range become a problem. The countermeasures preferably used in the present invention are that the prismatic structures are formed to be inclined with respect to the reference plane of the incidence side surface so that the prismatic structures can be arranged across the pixels to thereby prevent moire. In this case, if the inclination angle is too large, deflection may occur in reflection by the optical path changing faces, or the like. As a result, large deviation may occur in the direction of output light. This is apt to cause lowering of display quality because anisotropy of light emission intensity in the direction of transmission of light in the light pipe becomes large so that light-utilizing efficiency is also reduced.

Figure 16:
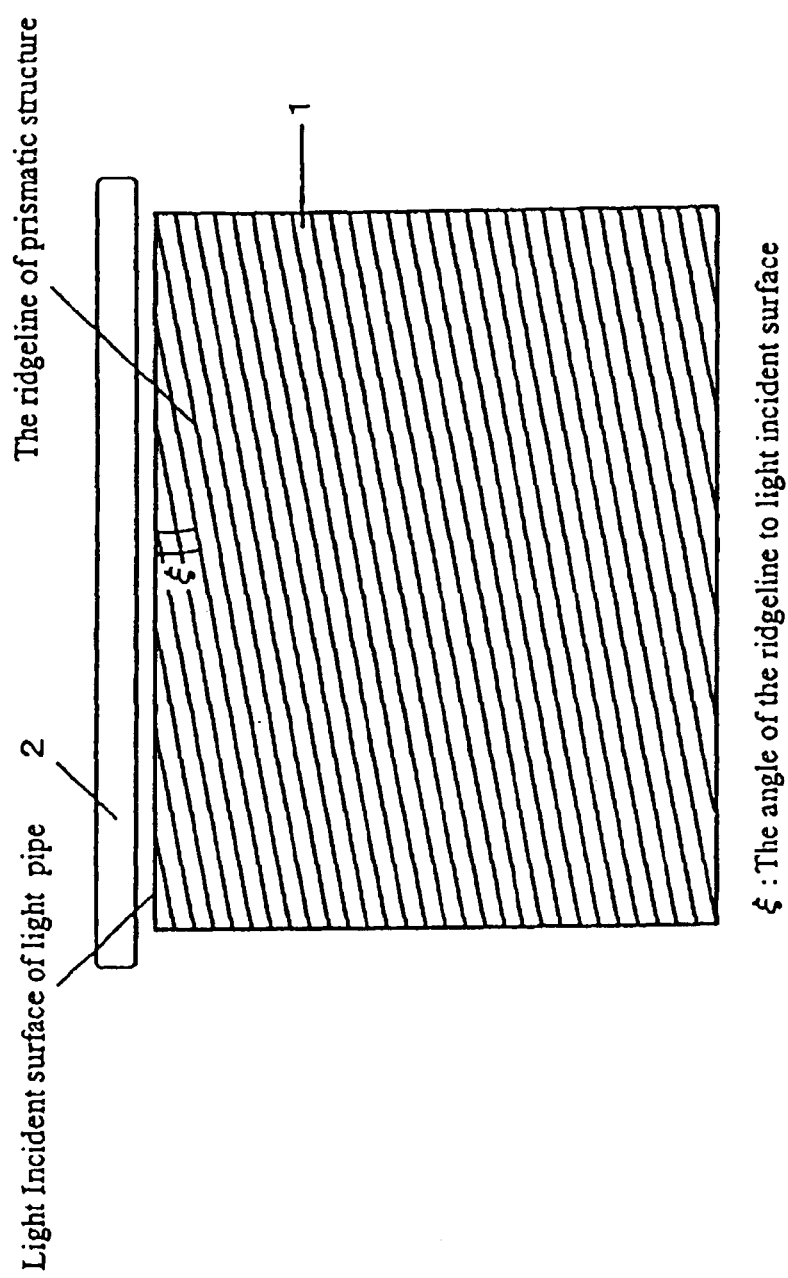
FIG. 16 shows a plan view of a light pipe.

From this point of view, and with reference to FIG. 16, the inclination angle $\xi$ in the direction of arrangement of the prismatic structures with respect to the reference plane of the incidence side surface, that is, in the direction of the ridge-lines of the prismatic structures, is preferably set to be in a range of ±30 degrees, especially in a range of ±28 degrees, more especially in a range of ±25 degrees. Incidentally, the symbol "±" means the direction of inclination with the incidence side surface as a reference. If the resolution of the liquid-crystal cell is low enough not to produce moire, or if moire is negligible, it is preferable that the direction of arrangement of the prismatic structures is as parallel with the incidence side surface as possible.

Any suitable form can be applied to the plate-like member as described above. Also when the plate-like member is shaped like a wedge, or the like, the surface shape of the plate-like member can be determined suitably and any suitable surface shape such as a straight-line surface, a curved surface, or the like, may be applied to the plate-like member. Also each of the optical path changing faces or prism-like structures constituting the light output means may be formed as any surface shape such as a straight-line surface, a refractive surface, a curved surface, or the like. Further, the prismatic structures may be constituted by a combination of prismatic structures different in shape, or the like, in addition to the pitch. Further, the prismatic structures may be formed as a series of convex or concave portions having continuous ridge lines or may be formed as intermittent convex or concave portions which are arranged discontinuously in the ridgeline direction at intervals of a predetermined pitch.

The respective shapes of the lower and incidence side surfaces of the plate-like member need not be particularly limited but may be determined suitably. Generally, these surfaces are provided as a lower surface as smooth and flat as possible and as an incidence side surface perpendicular to the lower surface. The shape of the incidence side surface may be provided as a shape, such as a concavely curved shape, or the like, corresponding to the outer circumference, or the like, of the light source so that improvement of light incidence efficiency can be attained. In addition, an incidence side surface structure having an introductory portion interposed between the incidence side surface and the light source may be provided. The shape of the introductory portion may be determined suitably in accordance with the shape of the light source, or the like.

The plate-like member may be made of any suitable material which is provided in accordance with the wavelength range of the light source and exhibits transparency in the range. Examples of the material used in a visible light range are transparent resin such as acrylic resin, polycarbonate resin, norbornene resin, epoxy resin, or the like, glass, and so on. A plate-like member made of a material exhibiting no birefringence or little birefringence is preferably used.

The plate-like member may be formed by a cutting method or by any suitable method. From the point of view of mass production, or the like, examples of the preferred producing method are: a method of transferring a shape to a thermoplastic resin by hot-pressing the thermoplastic resin against a mold capable of forming a predetermined shape; a method of filling a mold capable of forming a predetermined shape with a hot-melted thermoplastic resin or with a resin fluidized by heat or through a solvent; a method of performing a polymerizing process after a mold capable of forming a predetermined shape is filled with a liquid resin polymerizable by heat or by ultraviolet rays or by radial rays, or the like, or after the liquid resin is cast in the mold; and so on.

Incidentally, the plate-like member may be formed as a laminate of parts made of one kind of material or different kinds of materials, for example, a laminate of a light-guide portion having a role of light transmission and a sheet having light output means (uppersurface) such as prism-like structure, or the like, formed thereon and being adhesively stuck to the light-guide portion. That is, the plate-like member need not be formed as an integral single-layer body constituted by one kind of material.

The thickness of the plate-like member can be determined suitably on the basis of the size of the light pipe, the size of the light source, etc. in accordance with the purpose of use. The general thickness of the plate-like member for use in forming a liquid-crystal display device, or the like, is not larger than 10 mm, especially in a range of from 0.1 to 5 mm, more especially in a range of from 0.3 to 3 mm, on the basis of the incidence side surface thereof. From the point of view of achievement of bright display, or the like, the preferred plate-like member is provided so that the total light-rays transmittance of incident light in directions of the upper and lower surfaces, particularly vertical incident light from the lower surface to the upper surface, is not lower than 90%, especially not lower than 92%, more especially not lower than 95% and that the haze is not higher than 30%, especially not higher than 15%, more especially not higher than 10%.

As shown in FIGS. 1 and 2 by way of example, an anti-reflection layer 12 made of a circularly polarizer is bonded to the lower surface of the plate-like member 1 through an adhesive layer 13 having a refractive index lower than that of the plate-like member. Thus, a light pipe is formed. A suitable circularly polarizer can be used as the anti-reflection layer. Generally, there is used a circularly polarizer constituted by a combination of a quarter-wave plate 12a and a linearly polarizer 12b as shown in FIGS. 1 and 2.

Figure 5:
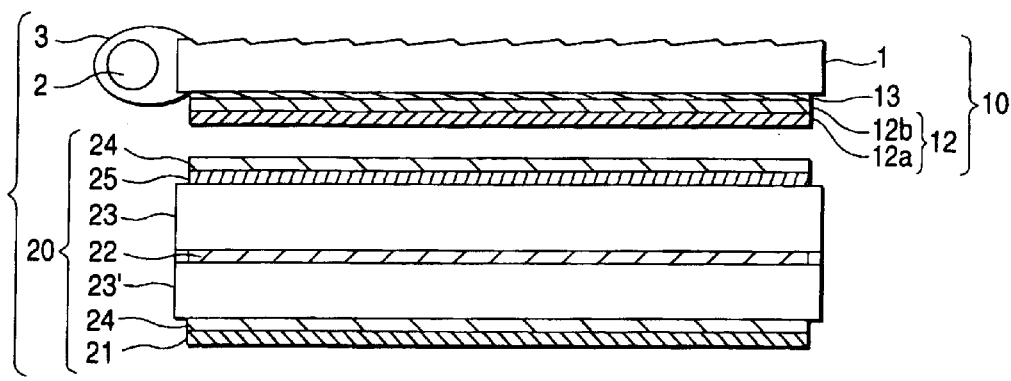
FIG. 5 shows a sectional view of a reflection type liquid-crystal display device.

According to the circularly polarizer constituted by a combination of the quarter-wave plate 12a and the linearly polarizer 12b, when, for example, light exited from the lower surface of the plate-like member as illustrated in FIG. 5 is reflected by the lower surface side of the liquid-crystal cell, or the like, light linearly polarized by the linearly polarizer 12b is circularly polarized when transmitted through the quarter-waveplate 12a. The circularly polarized light passes through the light pipe. When the light is reflected by the lower surface side of the liquid-crystal cell, or the like, the phase of the circularly polarized light is inverted. The reflected light thereof enters the quarter-wave plate again, so that the light is linearly polarized. Hence, when the light enters the linearly polarizer again, the light cannot be transmitted through the linearly polarizer because the light is linearly polarized light in a direction to be absorbed by the phase inverting effect. Accordingly, anti-reflection is achieved. In this case, arranging the optical axis of the linearly polarizer and the delayed phase axis of the quarter-wave plate so as to cross each other at an angle in a range of from 35 to 55 degrees, especially at an angle of 45 degrees, is favorable from the point of view of preventing such reflected light from being transmitted through the polarizer.

As a result, both in an operating mode and in an external light mode, light transmitted through the light pipe arranged on the front side and then reflected by the lower surface side of the liquid-crystal cell, or the like, is prevented from exiting, as leaking light, from the upper surface by passing through the light pipe again. Hence, lowering of contrast, or the like, can be prevented from being caused by overlapping of the leaking light with the display image.

In the above description, the phase inverting effect of the quarter-wave plate increases as the degree of circular polarization increases. However, when only the quarter-wave plate is provided, good circular polarization cannot be obtained on the whole wavelength region because wavelength dispersion generally occurs in the retardation. Therefore, when a half-wave plate is used in combination with the quarter-wave plate, good circular polarization can be obtained in almost of the visible light region. Hence, the anti-reflection layer may be constituted by a combination of a quarter-wave plate, a half-wave plate and a linearly polarizer so that the effect to prevent reflected light from being transmitted through the linearly polarizer can appear in a wavelength range as wide as possible, especially in a visible light range as wide as possible. This measure can improve the visual recognition of the display light more greatly.

The half-wave plate may be arranged so that the delayed phase axis of the half-wave plate is different in angle from the delayed phase axis of the quarter-wave plate. Alternatively, the half-wave plate maybe combined with a plate exhibiting wavelength dispersing characteristic different from that of the quarter-wave plate. Alternatively, the aforementioned two measures may be used in combination. The wavelength region subjected to phase inversion can be widened stably by any one of the aforementioned measures. In this case, in arrangement concerning difference in angle, it is preferable, from the point of view of widening the wavelength region subjected to phase inversion, that the optical axis of the linearly polarizer and the optical axis of the half-wave plate cross each other at an angle θ in a range of from 5 to 25 degrees and that the optical axis of the linearly polarizer and the optical axis of the quarter-wave plate cross each other at an angle of from 2θ+35 to 2θ+55.

A suitable material can be used as each of the linearly polarizer, the quarter-wave plate and the half-wave plate without any specific limitation. Examples of the polarizer used are: a polarizing film obtained by drawing a hydrophilic high-molecular film such as a polyvinyl alcohol film, a partially formalized polyvinyl alcohol film or a partially saponified ethylene-vinyl acetate copolymer film while making the hydrophilic high-molecular film adsorb iodine or a dichromatic material such as a dichromatic dye; a polyene-aligned polarizing film such as polyvinyl alcohol dehydrate or polyvinyl chloride dehydrochlorinate; and so on. The linearly polarizer may be formed so that one or two transparent protective layers made of a coating layer of resins, a laminate layer of films, or the like, are provided on one or both surfaces of the aforementioned polarizing film for the purpose of protecting water resistance, or the like. Further, the linearly polarizer may have a polarizing layer made of a liquid-crystal polymer or of a liquid-crystal-containing polymer. A linearly polarizer high in transmittance is preferably used from the point of view of bright display, or the like.

On the other hand, examples of each of the quarter-wave plate and the half-wave plate are: a plate having an aligned layer of a drawn film made of any suitable resin or an aligned layer of a liquid-crystal polymer; a plate made of inorganic crystal; and so on. The drawn film may be prepared by any suitable drawing treatment such as uniaxial or biaxial drawing based on a free end and a fixed end, thicknesswise molecular-aligned drawing, or the like.

The anti-reflection layer 12 is bonded to the lower surface of the plate-like member 1 through an adhesive layer 13 having a refractive index lower than that of the plate-like member. Hence, light incident on the incidence side surface or transmitted light thereof can be transmitted to the back of the plate-like member efficiently. From the point of view of efficiency of total reflection to achieve the aforementioned transmission, efficiency of incidence of external light, or the like, owing to suppression of interfacial reflection, etc., the refractive index of the adhesive layer is preferably set to be lower than the refractive index of the plate-like member by 0.01 or more, especially by a value of from 0.02 to 0.2, more especially by a value of from 0.05 to 0.15. From the point of view of practical performance to balance the adhesive layer with the plate-like-member-forming material, the refractive index of the adhesive layer is preferably set to be not higher than 1.47. A suitable material can be used as an adhesive agent for forming the adhesive layer. The adhesive agent is not particularly limited in kind except the refractive index. A tacky layer can be preferably used from the point of view of easiness in bonding work.

On the other hand, in FIGS. 10 and 11, a light-diffusing layer 112 having a surface of fine prismatic structures is bonded to the lower surface of the plate-like member 101 through an adhesive layer 113 having a refractive index lower than that of the plate-like member. Accordingly, a light pipe is formed. Any suitable material having a surface of fine prismatic structures can be used as the light-diffusing layer. Incidentally, examples of the material include: a coating hardened layer having a surface of fine prismatic structures and containing high-refractive-index transparent particles dispersed in a low-refractive-index transparent resin; a coating hardened layer of a transparent resin having a surface of fine prismatic structures and containing air bubbles dispersed therein; a surface structure of fine prismatic structures crazed by swelling a surface of a base material through a solvent; a transparent resin layer having an irregular convex/concave surface; a layer containing the aforementioned layers provided on a transparent support base material, especially on a transparent film; and so on.

The irregular convex/concave surface can be formed by a suitable method such as a mechanical or/and chemical treatment method in which a roughened surface shape of a roll, a mold, or the like, subjected to surface-roughening treatment is transferred to a surface of a base material or to a surface of a coating layer of a transparent resin provided on the base material. Examples of the transparent particles may be inorganic particles or organic particles with a mean particle size of from 0.5 to 30 µm. The inorganic particles are made of silica, alumina, titania, zirconia, oxide tin, indiumoxide, cadmium oxide, antimony oxide, etc. and may be electrically conductive. The organic particles are made of crosslinked or non-crosslinked polymers. One member or a combination of two or more members suitably selected from the inorganic particles and the organic particles may be used as the fine particles. Incidentally, the light-diffusing layer may be provided as a single layer as shown in FIG. 1 or may be provided as a multilayer having a transparent support base material 112a such as a transparent film, and a surface fine structure layer 112b provided on the support base material 112a as shown in FIG. 11. Incidentally, a material exhibiting weak diffusing ability to an extent that the display image is not disturbed is preferably used as the light-diffusing layer.

The light-diffusing layer 112 is bonded to the lower surface of the plate-like member 101 through the adhesive layer 113 having a refractive index lower than that of the plate-like member. Hence, light incident on the incidence side surface or transmitted light thereof can be transmitted to the back of the plate-like member efficiently. From the point of view of the efficiency of total reflection to achieve the transmission, the efficiency of incidence of external light, or the like, due to suppression of reflection by the interfaces, etc., the refractive index of the adhesive layer is preferably lower than that of the plate-like member by a value of not lower than 0.01, especially by a value of from 0.02 to 0.2, more especially in a value of from 0.05 to 0.15. An adhesive layer having a refractive index of not higher than 1.47 is preferred from the point of view of practical performance in terms of balance with the plate-like member-forming material.

Any suitable one may be used as an adhesive agent for forming the adhesive layer. The material is not particularly limited in kind except the point of view of the refractive index. A tacky layer is preferably used as an adhesive layer from the point of view of easiness in bonding work, or the like. Incidentally, it is preferable from the point of view of efficiency of incidence due to suppression of reflection of external light, or the like, in the interfaces that the refractive index of the light-diffusing layer bonded to the lower surface of the plate-like member 101 through the adhesive layer 113 is higher than that of the adhesive layer 113 especially by a value of not larger than 0.2, more especially by a value of from 0.01 to 0.15.

As shown in FIG. 11, an anti-reflection layer 114 may be provided on the fine structure surface in the outside of the light-diffusing layer 112 as occasion demands. The addition of the anti-reflection layer is effective in suppressing reflection of external incident light by the lower surface of the light pipe, but the suppression of reflection acts unfavorably in terms of confinement of transmitted light in the light pipe, that is, the suppression of reflection does not contribute to improvement of luminance. It is therefore preferable that the anti-reflection layer is added for the purpose of suppressing the formation of an image of reflected light or suppressing the light leaking from the upper surface when the image of light reflected in the lower surface of the light pipe is intensive or when light leaking from the upper surface overlaps the display image by means of the liquid-crystal cell so that white paling or lowering of contrast is intensive. Incidentally, the anti-reflection layer can be formed suitably from a material such as an interference film according to the background art.

In the light pipe according to the present invention, incident light from the upper and lower surfaces can be transmitted well so as to exit from the lower or upper surface. Hence, light collimated accurately by use of the light pipe can be output in a direction excellent in perpendicularity favorably for visual recognition. Hence, there can be formed a plane light source unit which uses efficiently light given from the light source so that the plane light source unit is excellent in brightness. Further, there can be formed any suitable device such as a reflection type liquid-crystal display device which is bright, easy to view and excellent in power saving.

Figure 4:
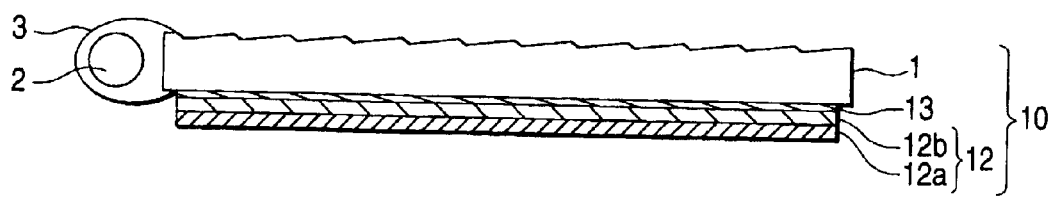
FIG. 4 shows a sectional view of a plane light source unit.
Figure 12:
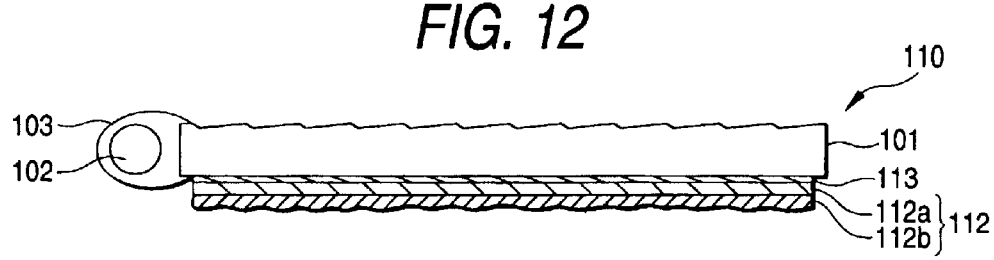
FIG. 12 shows a sectional view of a plane light source unit.

FIGS. 4 and 12 show a plane light source unit 10, 110 having a light pipe according to the present invention. For example, the plane light source unit can be formed by arranging a light source 2, 102 on the incidence side surface of the plate-like member 1, 101 in the light pipe as shown in FIGS. 4 and 12. The plane light source unit can be preferably used as a side front-lighting system, or the like. A suitable material can be used as the light source. Examples of the material generally preferably used may include: a linear light source such as a (cold or hot) cathode tube, or the like; a point light source such as a light-emitting diode, or the like; an array in which such point light sources are set in a linear or planar array, or the like; a light source using a device for converting light of a point light source into light emitted at regular or irregular intervals to thereby form a linear light source; and so on. A cold-cathode tube is particularly preferred from the point of view of power saving, durability, etc. One light source may be arranged on one of side surfaces of the plate-like member or a plurality of light sources may be arranged on two or more side surfaces of the plate-like member.

In accordance with necessity, as illustrated in FIGS. 4 and 12, the plane light source unit maybe formed in a combined body in which suitable auxiliary means are provided such as a light source holder 3 or 103 for surrounding the light source 2 or 102 to guide diverging light from the light source 2 or 102 to the incidence side surface of the plate-like member 1 or 101. A resin sheet coated with a high-reflectance metal thin film, a sheet of metal foil, or the like, can be generally used as the light source holder. When the light source holder is bonded to end portions of the plate-like member through an adhesive agent, or the like, the formation of the light output means in the adhesive portion may be omitted.

As described above, the plane light source unit according to the present invention is excellent in light-utilizing efficiency so that light bright and excellent in perpendicularity can be provided. Moreover, it is easy to increase the area of the plane light source unit. Hence, the plane light source unit can be used as a front-lighting system for a reflection type liquid-crystal display device, or the like, and can be preferably applied to any suitable device. Hence, a power-saving reflection type liquid-crystal display device bright and easy to view can be obtained.

The reflection type liquid-crystal display device using a front-lighting system according to the present invention can be formed by arranging a liquid-crystal cell having a reflection layer on the light exit side of the plane light source unit, that is, through the anti-reflection layer on the lower surface side of the plate-like member. FIGS. 5, 6, 13 and 14 show examples thereof. The reference numeral 10 or 110 designates a plane light source unit; and 20 or 120 liquid-crystal display panel having a liquid-crystal cell having a reflection layer. The reference numeral 22 or 122 designates a liquid-crystal layer; and 23, 23', 23", 123, 123' or 123", a cell substrate for holding liquid crystal. These form a liquid-crystal cell. The reference numerals 21 or 121 designates a reflection layer; and 21' or 121' a reflection layer which serves also as an electrode. Incidentally, the reference numeral 24 or 124 designates a polarizer; and 25 or 125 a light-diffusing layer.

Generally, the reflection type liquid-crystal display device is formed by assembling a liquid-crystal cell having an electrode functioning as a liquid-crystal shutter, a driver attached to the liquid-crystal cell, a polarizer, a front-lighting system and a reflection layer and by assembling constituent parts such as a compensatory phase retarder, a light-diffusing layer, etc. suitably as occasion demands. In the present invention, the reflection type liquid-crystal display device can be formed in accordance with the background art as shown in the drawings without any specific limitation except that the plane light source unit is used. Incidentally, the electrode such as a transparent electrode is not shown in the drawings.

Hence, the liquid-crystal cell used is not particularly limited. For example, on the basis of the format of alignment of liquid crystal, there can be used a suitable liquid-crystal cell such as a twisted or non-twisted cell such as a TN liquid-crystal cell, an STN liquid-crystal cell, a perpendicularly aligned cell, an HAN cell, an OCB cell; a guest-host liquid-crystal cell; or a ferroelectric liquid-crystal cell. Further, the method for driving liquid crystal is not particularly limited. For example, a suitable drive method such as an active matrix method or a passive matrix method may be used. Further, the cell substrate and the electrode need not be a transparent substrate and a transparent electrode in the position where illumination light or display light need not be transmitted. Hence, each of the cell substrate and the electrode may be constituted by an opaque body.

Figure 6:
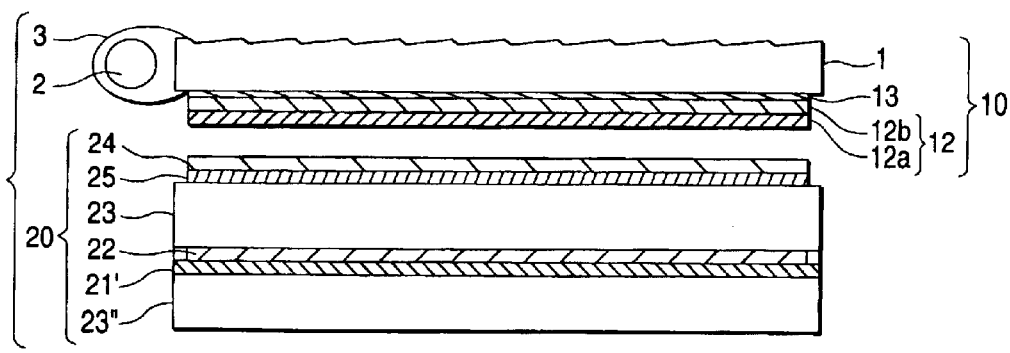
FIG. 6 shows a sectional view of another reflection type liquid-crystal display device.
Figure 13:
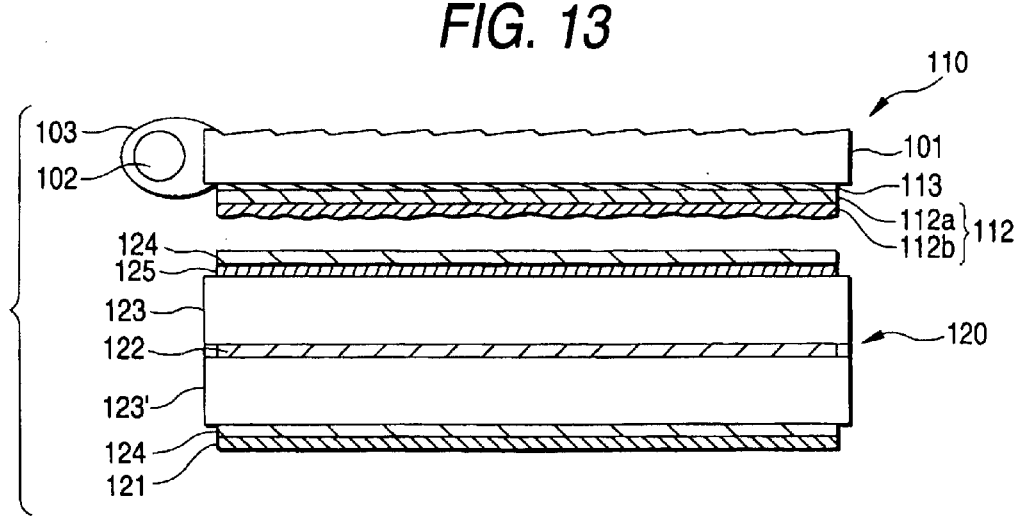
FIG. 13 shows a sectional view of a reflection type liquid-crystal display device.

The arrangement of the reflection layer 21, 21', 121 or 121' is essential to the reflection type liquid-crystal display device. The position of arrangement of the reflection layer can be determined suitably. For example, the reflection layer may be provided in the outside of the liquid-crystal cell as shown in FIGS. 5 and 13 or may be provided in the inside of the liquid-crystal cell as shown in FIGS. 6 and 14. The reflection layer can be formed as a suitable reflection layer according to the background art. Examples of the reflection layer are: a coating layer containing powder of a high-reflectance metal such as aluminum, silver, gold, copper or chromium in a binder resin; a layer of a metal thin film deposited by a vapor deposition method, or the like; a reflection sheet having the coating or deposited layer supported by a base material; a sheet of metal foil; and so on. When, for example, the reflection layer 21', or 121' is provided in the inside of the liquid-crystal cell as shown in FIGS. 6 and 14, the reflection layer may be formed of a highly electrically conductive material such as a high-reflectance metal so that the reflection layer can serve also as an electrode. Alternatively, the reflection layer may be used in combination with a transparent electrode, or the like. Alternatively, the reflection layer may be constituted by a transparent electrode.

A suitable plate such as the aforementioned linearly polarizer can be used as the polarizer for controlling display light. One polarizer may be arranged on one surface of the liquid-crystal cell or two polarizers may be arranged on both surfaces of the liquid-crystal cell as shown in the drawings. Incidentally, examples of the polarizer may be: a polarizing film obtained by drawing a hydrophilic high-molecular film such as a polyvinyl alcohol film, a partially formalized polyvinyl alcohol film or a partially saponified ethylene-vinyl acetate copolymer film while making the hydrophilic high-molecular film adsorb iodine or a dichromatic material such as a dichromatic dye; a polyene-aligned polarizing film such as polyvinyl alcohol dehydrate or polyvinyl chloride dehydrochlorinate; and so on. Further, the polarizer may be formed so that one or two transparent protective layers made of a coating layer of resins, a laminate layer of films, or the like, are provided on one or both surfaces of the aforementioned polarizing film for the purpose of protecting water resistance, or the like. Further, the polarizer may have a polarizing layer made of a liquid-crystal polymer or of a liquid-crystal-containing polymer.

On the other hand, the light-diffusing layer is provided in accordance with necessity for the purposes of: making brightness uniform by preventing unevenness in brightness and darkness; reducing moire owing to mixture of adjacent light rays; and so on. A suitable layer can be also used as the light-diffusing layer. Incidentally, examples of the layer include: a coating hardened layer containing high-refractive-index transparent particles dispersed in a low-refractive-index transparent resin; a coating hardened layer of a transparent resin containing air bubbles dispersed therein; a transparent resin layer crazed by swelling a surface of a base material through a solvent; a transparent resin layer having an irregular convex/concave surface; a diffusing sheet containing the aforementioned layers provided on a support base material; and so on. The light-diffusing layer may be formed as a light-diffusing layer containing transparent particles dispersed in an adhesive layer so that the light-diffusing layer serves also as an adhesive layer. One light-diffusing layer may be disposed in a suitable position of the liquid-crystal display panel or two or more light-diffusing layers may be disposed in suitable positions of the liquid-crystal display panel.

The irregular convex/concave surface can be formed by a suitable method such as a mechanical or/and chemical treatment method in which a roughened surface shape of a roll, a mold, or the like, subjected to surface-roughening treatment is transferred to a surface of a base material or to a surface of a coating layer of a transparent resin provided on the base material. Examples of the transparent particles may be inorganic particles or organic particles with a mean particle size in a range of from 0.5 to 30 $\mu$m. The inorganic particles are made of silica, alumina, titania, zirconia, oxide tin, indium oxide, cadmium oxide, antimony oxide, etc. and may be electrically conductive. The organic particles are made of crosslinked or non-crosslinked polymers. One member or a combination of two or more members suitably selected from the inorganic particles and the organic particles may be used as the tansparent particles. Incidentally, the light-diffusing layer can be provided also for the anti-reflection layer of the light pipe. One light-diffusing layer or two or more light-diffusing layers may be arranged in suitable positions of the liquid-crystal display device. A material exhibiting weak diffusing ability to an extent that the display image is not disturbed is preferably used as the light-diffusing layer.

On the other hand, the compensatory phase retarder is provided for compensating for wavelength dependence of birefringence, or the like, to attain improvement of visibility, or the like. The compensatory phase retarder is disposed either between the visual side polarizer and the liquid-crystal cell and between the back side polarizer and the liquid-crystal cell as occasion demands. A suitable plate in accordance with the wavelength range, or the like, can be used as the compensatory phase retarder. The compensatory phase retarder maybe formed as a single layer or as a multilayer of two or more retardation layers. Incidentally, when the reflection type liquid-crystal display device is formed, other suitable optical devices such as an anti-glare layer, an anti-reflection layer, etc. may be also arranged suitably. The phase retarder may be formed from suitable materials such as drawn films of various kinds of resins or aligned layers of liquid-crystal polymers. The drawn films may be prepared by various kinds of drawing treatments such as a uniaxial or biaxial drawing treatment using a free end and a fixed end, a drawing treatment for molecular aligning also in the thicknesswise direction, and so on. Incidentally, when a reflection type liquid-crystal display device is formed, other suitable optical devices such as an anti-glare layer may be disposed suitably.

The reflection type liquid-crystal display device according to the present invention is viewed through light transmitted through the plane light source unit, especially through the flat or long side faces of the plate-like member in the plane light source unit as described above. Incidentally, when the reflection layer 21' or 121' is provided in the inside of the liquid-crystal cell as shown in FIGS. 7 and 14, light $\alpha 1$ ($\alpha 2$ in FIG. 14) exiting from the lower surface of the plate-like member 1 or 101 is reflected $\alpha 2$ in FIG. 7 and $\alpha$ 3 in FIG. 14) through the reflection layer 21', 121' via the anti-reflection layer 12 or 112, the polarizer 24 or 124, the liquid-crystal layer 22 or 122, etc. in a mode in which the plane light source unit is switched on. The reflected light reaches the plate-like member 1, 101 via the liquid-crystal layer, the polarizer, etc. in the reverse course. Display light $\alpha 3$ ($\alpha 4$ in FIG. 14) transmitted through the long side faces A2 is viewed. In this case, intensive leaking light exits in a direction largely shifting in angle from the frontal direction perpendicular to the liquid-crystal cell. Hence, because leaking light exiting in the frontal direction is weak in cooperation with contribution of the anti-reflection layer, a display image excellent in display quality can be viewed through the long side faces in a direction near the frontal direction.

On the other hand, also in an external light mode in which the plane light source unit is switched off, incident light on the long side faces A2 in the upper surface of the plate-like member 1, 101 is transmitted through the anti-reflection layer, the polarizer, the liquid-crystal layer, the reflection layer, etc. and reaches the plate-like member 1, 101 in the reverse course in the same manner as described above. A display image transmitted through the long side faces can be viewed in a direction near the frontal direction in a state in which the display image is little disturbed by the plate-like member and excellent in display quality. Incidentally, the plane light source unit can be switched on/off by a suitable method.

Optical devices or parts such as a liquid-crystal cell, a polarizer, etc. for forming the plane light source unit or the liquid-crystal display device may be wholly or partially integrally laminated/fixed onto one another or may be disposed separably. From the point of view of prevention of lowering of contrast based on suppression of interfacial reflection, etc., it is preferable that such optical devices or parts are fixed onto one another. A suitable transparent adhesive agent such as a tackifier can be used in the fixing/adhering process. The layer of the transparent adhesive agent may be made to contain the aforementioned transparent particles so that the layer is provided as an adhesive layer exhibiting a diffusing function.

EXAMPLE 1

A surface of brass processed into a predetermined shape in advance was cut by a diamond bit to thereby produce a core for forming an upper surface. The core was put in a mold. The mold was heated at 100° C. and filled with molten polymethyl methacrylate (refractive index: 1.50). Thus, a plate-like member having light output means was formed. The plate-like member was 60 mm wide and 42 mm deep. The plate-like member had an incidence side surface 1.0 mm thick, and a counter end 0.6 mm thick. The plate-like member had flat upper and lower surfaces. The plate-like member had sectionally triangular continuous grooves in the upper surface. The grooves were disposed at intervals of a pitch of 240 μm so as to be parallel with the incidence side surface. The grooves had optical path changing faces, and flat faces. The inclination angle between each of the optical path changing faces was 42.5 degrees. The vertex angle between each of the optical path changing faces and the corresponding flat face was 70 degrees. The flat faces formed in the upper surface are disposed between the grooves. The projected width of each optical path changing face on the lower surface was in a range of from 10 to 16 μm. The projected width increased as the position went farther from the incidence side surface. The ratio of the projected area of the flat faces on the lower surface to the projected area of the optical path changing faces on the lower surface was not lower than 15/1. Incidentally, the sectionally triangular continuous grooves were formed to start from a position distanced by 2 mm from the incidence side surface.

Then, a linearly polarizer (EG1425DU made by NITTO ELECTRIC INDUSTRIAL Co. Ltd.) and a quarter-wave plate made of a uniaxially drawn film of polycarbonate were bonded/laminated to each other through an adhesive layer having a refractive index of 1.51 so that the transmission axis and the delayed phase axis thereof crossed each other at an angle of 45 degrees. Thus, an anti-reflection layer A constituted by a circularly polarizer was prepared. The anti-reflection layer A was bonded to the lower surface of the plate-like member through an adhesive layer having a refractive index of 1.47. Thus, a light pipe was obtained. A cold-cathode tube was disposed on the incidence side surface of the plate-like member and surrounded by a light source holder made of a silver-deposited polyester film. The edges of the light source holder were bonded/fixed to upper and lower end surfaces of the plate-like member by a double-side adhesive tape. Thus, a plane light source unit was obtained. Then, a normally white reflection type liquid-crystal display panel was disposed on the anti-reflection layer side of the plane light source unit. Thus, a reflection type liquid-crystal display device was obtained. Incidentally, the plane light source unit was switchable so that the liquid-crystal display device was operative/inoperative by switching on/off a power supply. The liquid-crystal display device was of a drive type in which all pixels were turned on/off.

EXAMPLE 2

A light pipe, a plane light source unit and a reflection type liquid-crystal display device were obtained in the same manner as in Example 1 except that a half-wave plate made of an uniaxially drawn film of polycarbonate was bonded/interposed between the linearly polarizer and the quarter-wave plate through an adhesive layer having a refractive index of 1.51 and except that an anti-reflection layer B constituted by a circularly polarizer prepared in this manner was used. Incidentally, the half-wave plate was disposed so that the delayed phase axis thereof crossed the transmission axis of the linearly polarizer at 15 degrees. The quarter-wave plate was disposed so that the delayed phase axis thereof crossed the transmission axis of the linearly polarizer at 75 degrees.

EXAMPLE 3

A light pipe, a plane light source unit and a reflection type liquid-crystal display device were obtained in the same manner as in Example 1 except that the plate-like member A was replaced by a plate-like member B. The plate-like member B was formed in the same manner as in Example 1 to have a flat lower surface. The plate-like member B had prism-like continuous grooves in the upper surface. The grooves were parallel with the incidence side surface and disposed adjacently to one another at intervals of a pitch of 210 μm. The inclination angle of each optical path changing face was 42.5 degrees. The difference in inclination angles of the long side faces was in a range of from 1.8 to 3.5 degrees. The difference between inclination angles of adjacent ones of the long side faces was not larger than 0.1 degree. The projected width of each short side face on the lower surface was in a range of from 10 to 16 μm. The projected width increased as the position went farther from the incidence side surface. The ratio of the projected area of the long side faces on the lower surface to the projected area of the optical path changing faces on the lower surface was not lower than 13/1.

EXAMPLE 4

A light pipe, a plane light source unit and a reflection type liquid-crystal display device were obtained in the same manner as in Example 1 except that a combination of the plate-like member B and an anti-reflection layer B was used.

EXAMPLE 5

A light pipe, a plane light source unit and a reflection type liquid-crystal display device were obtained in the same manner as in Example 1 except that the plate-like member B and the anti-reflection layer B were used in combination and bonded to each other through an adhesive layer having a refractive index of 1.45.

COMPARATIVE EXAMPLE 1

A light pipe, a plane light source unit and a reflection type liquid-crystal display device were obtained in the same manner as in Example 1 except that the plate-like member A and the anti-reflection layer A were bonded to each other through an adhesive layer having a refractive index of 1.51.

COMPARATIVE EXAMPLE 2

A light pipe, a plane light source unit and a reflection type liquid-crystal display device were obtained in the same manner as in Example 2 except that the plate-like member A and the anti-reflection layer B were bonded to each other through an adhesive layer having a refractive index of 1.51.

COMPARATIVE EXAMPLE 3

A light pipe, a plane light source unit and a reflection type liquid-crystal display device were obtained in the same manner as in Example 3 except that the plate-like member B and the anti-reflection layer A were bonded to each other through an adhesive layer having a refractive index of 1.51.

COMPARATIVE EXAMPLE 4

A light pipe, a plane light source unit and a reflection type liquid-crystal display device were obtained in the same manner as in Example 4 except that the plate-like member B and the anti-reflection layer B were bonded to each other through an adhesive layer having a refractive index of 1.51.

COMPARATIVE EXAMPLE 5

A plane light source unit and a reflection type liquid-crystal display device were obtained in the same manner as in Example 5 except that the plate-like member B was used as a light pipe without use of the anti-reflection layer B.

Evaluation Test 1

Frontal luminance in a visual surface in positions (incident portion and rear end portion) distanced by 10 mm from the incidence side surface and the counter end respectively and in the center portion in the widthwise center of the light pipe in white-state reflection type liquid-crystal display device obtained in each of Examples 1 to 5 and Comparative Examples 1 to 5 was measured by a luminance meter (BM-7 made by TOPCON Corp.) in an operating mode in which the plane light source unit was switched on. Results were shown in the following Table. Further, the angle distribution of intensity of light exited from the lower surface of the light pipe in the plane light source unit obtained in each of Examples 4 and 5 and Comparative Examples 4 and 5 was examined. Results were shown in FIG. 9. Incidentally, in FIG. 9, the frontal luminance was standardized as 100.

| | Frontal luminance (cd/m$^2$) | | |
|---|---|---|---|
| | Incident portion | Center portion | Rear end portion |
| Example 1 | 72 | 64 | 60 |
| Example 2 | 69 | 60 | 58 |
| Example 3 | 71 | 68 | 62 |
| Example 4 | 70 | 71 | 60 |
| Example 5 | 81 | 85 | 85 |
| Comparative Example 1 | 50 | 35 | 22 |
| Comparative Example 2 | 58 | 30 | 20 |
| Comparative Example 3 | 55 | 29 | 25 |
| Comparative Example 4 | 52 | 30 | 21 |
| Comparative Example 5 | 158 | 172 | 182 |

It is apparent from Table that luminance in Examples 1 to 5 is improved compared with Comparative Examples 1 to 5 and that variation in luminance on the display surface in Examples 1 to 5 is small and the uniformity of the luminance in Examples 1 to 5 is improved. Further, it is apparent from comparison between Example 5 and any other Example that reducing the refractive index of the adhesive layer for bonding the anti-reflection layer as greatly as possible is effective in improving luminance and suppressing variation in luminance.

Figure 9:
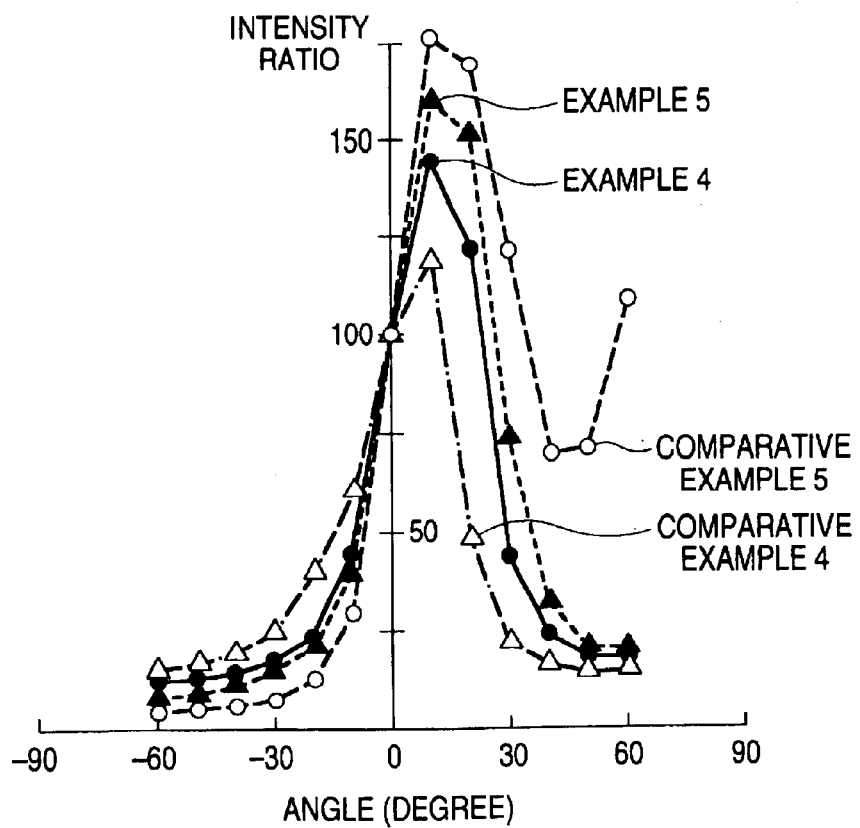
FIG. 9 shows a graph showing output characteristic.

On the other hand, any case in FIG. 9 shows the maximum intensity of output light within 30 degrees with respect to the normal on the basis of the characteristic of the optical path changing faces in the plate-like member. In comparison with Comparative Example 5 in which there is no anti-reflection layer made of a circularly polarizer so that reflected light is generated in the lower surface of the plate-like member forming an interface with air, light is output in a wide angle range in Examples 1 to 5 and particularly the angle range in Example 5 is wider than that in Example 4. It is apparent from these facts and the results shown in Table that light-utilizing efficiency can be improved more greatly as the refractive index of the adhesive layer for bonding the anti-reflection layer decreases as greatly as possible.

In Comparative Example 5, it is hard to view display because of light reflected by the lower surface of the plate-like member as described above under the environment of presence of external light. On the other hand, in Examples 1 to 5, generation of light reflected by the lower surface of the plate-like member is little observed. It is further found that the case of the anti-reflection layer B containing the half-wave plate added thereto is more excellent in anti-reflection performance than the case of the anti-reflection layer A used in Examples and Comparative Examples. It is apparent from the above description that a reflection type liquid-crystal display device using a front-lighting system is achieved as a device bright, excellent in uniformity of brightness and good in display quality according to Examples 1 to 5.

REFERENCE EXAMPLE 1

A surface of brass processed into a predetermined shape in advance was cut by a diamond bit to thereby produce a core for forming an upper surface. The core was put in a mold. The mold was heated at 100° C. and filled with molten polymethyl methacrylate (refractive index: 1.50). Thus, a plate-like member having light output means was formed. The plate-like member was 60 mm wide and 42 mm deep. The plate-like member had an incidence side surface 1.0 mm thick, and a counter end 0.6 mm thick. The plate-like member had flat upper and lower surfaces. The plate-like member had sectionally triangular continuous grooves in the upper surface. The grooves were disposed at intervals of a pitch of 240 µm so as to be parallel with the incidence side surface. The grooves had optical path changing faces, and flat faces. The inclination angle of each of the optical path changing faces was 42.5 degrees. The vertex angle between each of the optical path changing faces and the corresponding flat face was 70 degrees. The flat faces formed in the upper surface are disposed between the grooves. The projected width of each optical path changing face on the lower surface was in a range of from 10 to 15 µm. The projected width increased as the position went farther from the incidence side surface. The ratio of the projected area of the flat faces on the lower surface to the projected area of the optical path changing faces on the lower surface was not lower than 15/1. Incidentally, the sectionally triangular continuous grooves were formed to start from a position distanced by 2 mm from the incidence side surface.

REFERENCE EXAMPLE 2

A plate-like member was obtained by a method according to Reference Example 1. The plate-like member was 60 mm wide and 42 mm deep. The plate-like member had an incidence side surface 1.0 mm thick, and a counter end 0.6 mm thick. The plate-like member had flat upper and lower surfaces. The plate-like member had prism-like continuous grooves in the upper surface. The grooves were disposed adjacently to one another at intervals of a pitch of 210 µm so as to be parallel with the incidence side surface. The grooves had optical path changing faces, and long side faces. The inclination angle of each of the optical path changing faces was 42.5 degrees. The difference in inclination angles of the long side faces was in a range of from 1.8 to 3.3 degrees. The difference between inclination angles of adjacent ones of the long side faces was not larger than 0.1 degree. The projected width of each optical path changing face on the lower surface was in a range of from 10 to 15 µm. The projected width increased as the position went farther from the incidence side surface. The ratio of the projected area of the long side faces on the lower surface to the projected area of the optical path changing faces on the lower surface was not lower than 13/1.

EXAMPLE 6

An ultraviolet-curable polyurethane resin (refractive index: 1.51) containing silica fine particles dispersed therein was applied onto one surface of a transparent denatured polyester film (refractive index: 1.51) and then cured by irradiation with ultraviolet rays. Thus, a layer having a surface structure of fine prismatic structures was attached to the polyester film to thereby form a light-diffusing sheet. An acrylic adhesive layer having a refractive index of 1.47 was provided on a surface of the light-diffusing sheet on which there was provided no surface fine structure layer. The light-diffusing sheet was bonded to the lower surface of the plate-like member obtained in Reference Example 1 through the adhesive layer to thereby obtain a light pipe. Then, a cold-cathode tube was disposed on the incidence side surface of the plate-like member and surrounded by a light source holder made of a silver-deposited polyester film. The edges of the light source holder were bonded/fixed to upper and lower end surfaces of the plate-like member through a double-side adhesive tape. Thus, a plane light source unit was obtained. Then, a normally white reflection type liquid-crystal display panel was disposed on the light-diffusing layer side of the plane light source unit. Thus, a reflection type liquid-crystal display device was obtained. Incidentally, the plane light source unit was switchable so that the liquid-crystal display device was operative/inoperative by switching on/off a power supply. The liquid-crystal display device was of a drive type in which all pixels were turned on/off.

EXAMPLE 7

A light pipe, a plane light source unit and a reflection type liquid-crystal display device were obtained in the same manner as in Example 6 except that the plate-like member obtained in Reference Example 1 was replaced by the plate-like member obtained in Reference Example 2.

EXAMPLE 8

A light pipe was obtained by bonding the light-diffusing sheet, which is produced in the same manner as in Example 6, to the lower surface of the plate-like member obtained in Reference Example 2 through an acrylic adhesive layer having a refractive index of 1.46. A plane light source unit and a reflection type liquid-crystal display device were obtained in the same manner as in Example 7 except that the above light pipe was used.

EXAMPLE 9

To obtain a light pipe, an anti-reflection layer of a coherent vacuum vapor deposited film was added to the outside of the light-diffusing layer of the light-diffusing sheet produced in the same manner as in Example 6 and the light-diffusing sheet was bonded to the lower surface of the plate-like member obtained in Reference Example 2 through an acrylic adhesive layer having a refractive index of 1.47. Thus, a light pipe was obtained. Then, a plane light source unit and a reflection type liquid-crystal display device were obtained in the same manner as in Example 7 except that the above light pipe was used.

COMPARATIVE EXAMPLE 6

The light-diffusing sheet produced in the same manner as in Example 6 was boned to the lower surface of the plate-like member obtained in Reference Example 1 through a phenyl group-substituted acrylic adhesive layer having a refractive index of 1.52 to thereby obtain a light pipe. A plane light source unit and a reflection type liquid-crystal display device were obtained in the same manner as in Example 6 except that the above light pipe was used.

COMPARATIVE EXAMPLE 7

A light, pipe, a plane light source unit and a reflection type liquid-crystal display device were obtained in the same manner as in Comparative Example 6 except that the plate-like member obtained in Reference Example 1 was replaced by the plate-like member obtained in Reference Example 2.

COMPARATIVE EXAMPLE 8

An anti-reflection layer of a coherent vacuum vapor deposited film was added to the outside of the light-diffusing layer of the light-diffusing sheet produced in the same manner as in Example 6 and the light-diffusing sheet was bonded to the lower surface of the plate-like member obtained in Reference Example 2 through a phenyl group-substituted acrylic adhesive layer having a refractive index of 1.52 in accordance with Comparative Example 6. Thus, a light pipe was obtained. A plane light source unit and a reflection type liquid-crystal display device were obtained in the same manner as in Example 7 except that the above light pipe was used.

Evaluation Test 2

Frontal luminance in a viewing surface in positions (incident portion and rear end portion) distanced by 10 mm from the incidence side surface and the counter end respectively and in the center portion in the widthwise center of the light pipe in the white-state reflection type liquid-crystal display device obtained in each of Examples 6 to 9 and Comparative Examples 6 to 8 was measured by a luminance meter (BM-7 made by TOPCON Corp.) in an operating mode in which the plane light source unit was switched on. Further, average values thereof were calculated. Results were shown in the following Table.

|  | Frontal luminance (cd/m$^2$) | | | |
| --- | --- | --- | --- | --- |
|  | Incident portion | Center portion | Rear end portion | Average |
| Example 6 | 87 | 82 | 76 | 81.7 |
| Example 7 | 98 | 95 | 85 | 92.7 |
| Example 8 | 95 | 101 | 93 | 96.3 |
| Example 9 | 93 | 94 | 82 | 89.7 |
| Comparative Example 6 | 91 | 80 | 68 | 79.7 |
| Comparative Example 7 | 105 | 94 | 77 | 92.0 |
| Comparative Example 8 | 98 | 85 | 68 | 83.7 |

It is apparent from the comparison between Example 6 and Comparative Example 6 and the comparison between Examples 7 and 8 and Comparative Example 7 and the comparison between Example 9 and Comparative Example 8 in Table that variation in luminance on the display surface in an operating mode is reduced to thereby largely improve uniformity of luminance, and that Examples 6 to 9 are superior to Comparative Examples 6 to 8 on the basis of averaged luminance. It is further apparent from the comparison between Examples 7 and 8 that the effect of total reflection of transmitted light increases to be effective in improving luminance and suppressing variation in luminance as the refractive index difference between the adhesive layer for bonding the light-diffusing layer and the plate-like member increases. Moreover, also in observation of external appearance, the quantity of light exited at a large angle from the upper surface in Examples 1 to 4 is clearly smaller than that in Comparative Examples 6 to 8. This is remarkable particularly in Example 8 in which the effect of total reflection is high. On the other hand, also in a reflection mode using external light, good display quality is obtained in Examples 6 to 9. It is apparent from the above description that a reflection type liquid-crystal display device using a front-lighting system is achieved as a device bright, excellent in uniformity of brightness and good in display quality according to Examples 6 to 9 both in the reflection mode and the operating mode.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe comprising:
   a plate-like member including light output means formed in an upper surface of said plate-like member so that light incident on an incidence side surface of said plate-like member is exited from a lower surface of said plate-like member through said light output means;
   an adhesive layer having a refractive index lower than that of said plate-like member; and
   an anti-reflection layer made of a circular polarizer and bonded to a lower surface of said plate-like member through said adhesive layer,
   wherein said light output means formed in said upper surface of said plate-like member is formed by a repetitive structure of prismatic structures each having an optical path changing face and a lone side face and arranged at intervals of a pitch of from 50 $\mu$m to 1.5 mm; each of said optical path changing faces is formed of a slope inclined downward from said incidence side surface to a counter end surface opposite thereto at an inclination angle in a range of from 35 to 48 degrees with respect to a reference plane of said lower surface of said plate-like member; each of said long side faces is made of a slope inclined at an angle in a range of from 0 to 10 degrees with respect to said reference plane; a difference between inclination angles of any two lone side faces is not larger than 5 degrees over a surface of said plate-like member; a difference between said inclination angles of adjacent ones of said long side faces is not larger than 1 degree; and a projected area of said lone side faces on said reference plane is not smaller than 5 times as large as that of said optical path changing faces on said reference plane.

2. A light pipe according to claim 1, wherein said anti-reflection layer made of a circular polarizer includes a quarter-wave plate, and a linear polarizer.

3. A light pipe according to claim 2, wherein said anti-reflection layer made of a circular polarizer further includes a half-wave plate.

4. A light pipe according to claim 3, wherein a maximum intensity of light exited from said lower surface of said plate-like member in a plane perpendicular to reference planes of both said lower surface and said incidence side surface of said plate-like member is inclined at an angle of not larger than 30 degrees with respect to a normal to said reference plane of said lower surface of said plate-like member.

5. A light pipe according to claim 1, wherein ridgelines defining edges of said optical path changing faces are inclined within a range of ±30 degrees with respect to a reference plane of said incidence side surface.

6. A light pipe according to claim 1, wherein said refractive index of said adhesive layer for bonding said anti-reflection layer to said lower surface of said plate-like member is lower than that of said plate-like member by 0.01 or more.

7. A light pipe according to claim 1, wherein said refractive index of said adhesive layer for bonding said anti-reflection layer to said lower surface of said plate-like member is not higher than 1.47.

8. A light pipe according to claim 1, wherein said adhesive layer for bonding said anti-reflection layer to said lower surface of said plate-like member is constituted by a tacky layer.

9. A plane light source unit wherein at least one light source is disposed on one side surface of a light pipe defined in claim 1.

10. A reflection type light-crystal display device wherein a liquid-crystal cell including a reflection layer is disposed on a light exit side of a plane light source unit defined in claim 9.

11. A light pipe comprising:
    a plate-like member including light output means formed in an upper surface of said plate-like member so that light incident on an incidence side surface of said plate-like member is exited from a lower surface of said plate-like member through said light output means;
    an adhesive layer having a refractive index lower than that of said plate-like member; and
    a light-diffusing layer including fine prismatic structures formed in a surface thereof and bonded to said lower surface of said plate-like member through said adhesive layer,
    wherein said light output means formed in said upper surface of said plate-like member is formed by a repetitive structure of prismatic structures arranged at intervals of a pitch of from 50 $\mu$m to 1.5 mm and each having an optical path changing face and a long side face; each of said optical path changing faces is constituted by a slope inclined downward from said incidence side surface side to a counter end side at an inclination angle in a range of from 35 to 48 degrees with respect to a reference plane of said lower surface so that a projected width of each of said slopes on said reference plane is not larger than 40 $\mu$m; and each of said long side faces is constituted by a slope inclined at an inclination angle in a range of from 0 to 10 degrees with respect to said reference plane so that an angle difference between any two long side faces over a surface of said plate-like member is not larger than 5 degrees, so that a difference between inclination angles of adjacent ones of said long side faces is not larger than 1 degree and so that a projected area of said long side faces on said reference plane is not smaller than 5 times as large as a projected area of said optical path changing faces on said reference plane.

12. A light pipe according to claim 11, wherein said light-diffusing layer is constituted by a fine prismatic-structure layer provided on a transparent film.

13. A light pipe according to claim 11, wherein said light-diffusing layer further includes an anti-reflection layer provided on said fine prismatic-structure layer.

14. A light pipe according to claim 11, wherein a direction of maximum intensity of light exited from said lower surface in a plane perpendicular both to a reference plane of said lower surface of said plate-like member and to a reference plane of said incidence side surface of said plate-like member is within 30 degrees with respect to a normal to said reference pane of said lower surface.

15. A light pipe according to claim 11, wherein ridgelines defining edges of said optical path changing faces are in a range of ±30 degrees with respect to a reference plane of said incidence side surface.

16. A light pipe according to claim 11, wherein the refractive index of said adhesive layer for bonding said light-diffusing layer to said lower surface of said plate-like member is lower by a value of from 0.01 to 0.2 than that of said plate-like member; and a refractive index of aid light-diffusing layer is higher than that of said adhesive layer.

17. A light pipe according to claim 11, wherein the refractive index of said adhesive layer for bonding said light-diffusing layer to said lower surface of said plate-like member is not higher than 1.47.

18. A light pipe according to claim 11, wherein said adhesive layer for bonding said light-diffusing layer to said lower surface of said plate-like member is constituted by a tacky layer.

19. A plane light source unit wherein at least one light source is disposed on one side surface of a light pipe defined in claim 11.

20. A reflection type liquid-crystal display device wherein a liquid-crystal cell including a reflection layer is disposed on a light exit side of a plane light source unit defined in claim 19.

* * * * *